United States Patent

Forman et al.

3,902,782
Sept. 2, 1975

[54] MERCUROUS CHLORIDE PRISM POLARIZERS

[75] Inventors: Richard A. Forman, Rockville, Md.;
William S. Brower, Vienna, Va.;
Harry S. Parker, Silver Spring, Md.

[73] Assignee: The United States of America as represented by the Secretary of Commerce, Washington, D.C.

[22] Filed: Nov. 14, 1974

[21] Appl. No.: 523,951

[52] U.S. Cl. .................................. 350/1; 350/157
[51] Int. Cl.² ........................................ G02B 5/20
[58] Field of Search ............................. 350/1, 157

[56] References Cited
UNITED STATES PATENTS
3,704,997   12/1972   Smith ................. 350/157

*Primary Examiner*—James B. Mullins
*Attorney, Agent, or Firm*—David Robbins; Alvin J. Englert

[57] ABSTRACT

Single crystals of mercurous chloride (calomel, $Hg_2Cl_2$), a material of enormous birefringence, have been found to be transparent from the visible out to about 16 $\mu$m in the infrared and to have a low optical absorption of about 2% per cm in the infrared. These properties make the crystals highly suited for the construction of polarizing prisms intended for use with high-powered infrared lasers or other sources of infrared radiation. Several ampoule and modified Bridgman furnace designs for growing the crystals at relatively low temperatures from the vapor phase are disclosed, as is a representative polarizing prism design.

8 Claims, 10 Drawing Figures

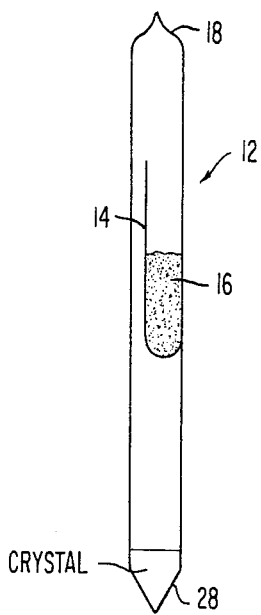
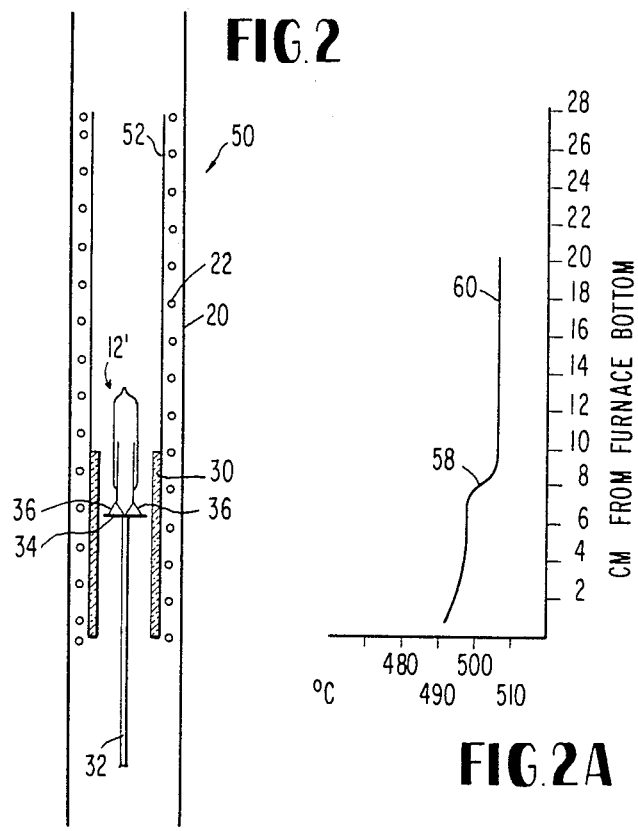
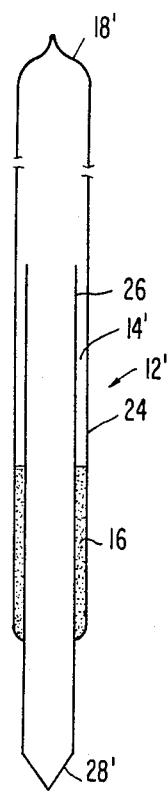
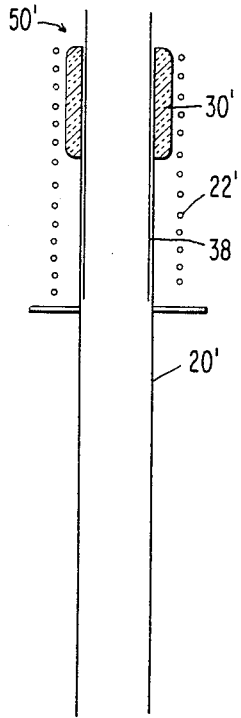
FIG.1 FIG.2 FIG.2A FIG.3 FIG.4 FIG.4A

MERCUROUS CHLORIDE PRISM POLARIZERS

BACKGROUND OF THE INVENTION

This invention relates to prism polarizers and more particularly to prism polarizers constructed from single crystals of mercurous chloride.

Prism polarizers are presently constructed from uniaxial crystals of calcite, quartz and a few other materials. Unfortunately, the natural deposits of calcite, the preferred material, are rapidly being depleted and numerous efforts to grow the material artificially have met with limited success. In addition, calcite is transparent only to about 2.3 $\mu$m in the infrared and therefore is not usable with a number of infrared lasers, such as the $CO_2$ and CO lasers operating at 10.6 and 5.5 $\mu$m, respectively.

While other types of polarizers, such as Brewster angle reflectors, pile-of-plates, and wire grids are available for use in the infrared, they generally are less flexible or are limited in the amount of infrared power they can handle, in comparison with prism-type polarizers. As is well known in the art, prism polarizers may take a variety of forms such as Rochon, Foucault, Glan, etc. In the Glan-type prism, for example, the incident beam is split into one polarization which exits in line with the incident beam, while the other polarization is reflected at a large angle, generally a right angle, and absorbed by an appropriately placed material.

SUMMARY OF THE INVENTION

The present invention provides a prism-type polarizer which is transparent over a surprisingly wide region of the spectrum, namely from the violet at 0.4 $\mu$m through red at 0.7 $\mu$m out to about 16 $\mu$m in the infrared. Furthermore, the prism has an unexpectedly low absorption in the infrared, namely about a 2 percent decrease in the incident intensity per cm of path length, which makes the polarizer compatible with high-intensity infrared radiation from lasers and the like. The low absorption avoids overheating and possible destruction of the polarizer while handling high-powered infrared radiation. In accordance with the invention, the prisms are constructed from single crystals of mercurous chloride, preferably grown by vapor transport in a modified Bridgman furnace.

BRIEF DESCRIPTION OF THE DRAWINGS

FIGS. 1, 3, 5A and 5B are sectioned elevational view of four ampoules for growing mercurous chloride crystals.

FIGS. 2 and 4 are sectioned elevational views of modified Bridgman furnaces.

FIGS. 2A and 4A are graphs showing the temperature profiles of the furnaces.

DETAILED DESCRIPTION OF THE INVENTION

Figure 5A:
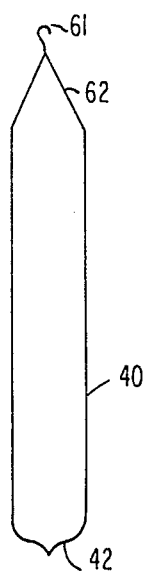

The starting material for the crystals of this invention is commercial powdered mercurous chloride. The powder preferably is preliminarily purified by sublimation; it is placed in a quartz or high-silica glass tube which is then evacuated to about $10^{-5}$ torr or less and sealed. The sealed tube is placed in a vertical gradient furnace with a bottom zone at about 350° C and a top zone which is about 10° C cooler. The powder rapidly sublimes and forms a fibrous mass at the at the top of the tube. The tube is cooled and broken and the sublimed mass is then transferred to a suitable ampoule such as the ampoule 12 shown in FIG. 1.

The ampoule 12 is constructed from quartz or high-silica glass tubing of a suitable diameter such as about 20 mm and it contains a pocket 14 for receiving the sublimed mercurous chloride charge 16. The bottom of the ampoule is tapered to a point as shown at 28 to cause the vapors condensing there to form a single seed crystal upon which the additional material desposits to form a large single crystal.

An alternative ampoule design is shown at 12' in FIG. 3. The charge pocket 16 in this design is provided by the overlapping ends of an inner tube 26 and an outer tube 24 joined as shown.

After charging, the ampoules 12 or 12' are evacuated to about $10^{-5}$ torr less and then sealed at their tops 18, 18'.

FIG. 2 shows a modified Bridgman furnace 50 for the ampoules of FIGS. 1 and 3. The furnace comprises an outer tube 20 and an inner tube 52 between which is placed an electrical resistance heating coil 22. The bottom portion of the furnace is lined with a tube of heat-insulating material 30 to establish a temperature gradient. The furnace also includes a movable rod 32, platform 34 and mounts 36 for holding and moving the sealed ampoules 12 or 12' through the gradient. As shown by curves 60 and 58 of FIG. 2A, the top of the furnace is set to run at about 508° C and the insulation 30 causes the bottom to run cooler at about 495° C.

Initially the platform 34 is raised so that the entire ampoule 12' is heated to the higher temperature. The platform is then lowered slowly, preferably at about 1–2 mm per day, causing the mercurous chloride vapors to deposit as a single crystal which starts at the tapered bottom point 28' of the ampoule.

Figure 5B:
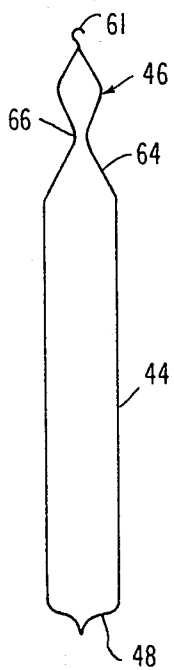

Two alternative ampoules 40 and 44 and a furnace therefor are shown in FIGS. 5A, 5B and 4, respectively. These ampoules are pulled upward through the furnace, so the tops are provided with a hook 61 and with tapers as shown at 62 (FIG. 5A) and at 64 (FIG. 5B). The latter taper 64 is joined by a neck 66 to a further tapered section 46. The neck 66 serves to ensure that only a single crystallite of the crystal started in section 46 will propagate into the main chamber.

In the furnace 50' of FIG. 4, the tube of thermal insulation 30' is placed at the top of the furnace, between the heating coil 22' and the furnace tube 20'. The inner surface of tube 20' is coated with a thin (about 0.1 inch) silver liner 38 to minimize local temperature gradients. As shown by curves 58' and 60' of FIG. 4A, the bottom of the furnace is set at about 390° C and the top runs about 10°–15° cooler.

In operation, the ampoule 40 or 44 is partially filled with the sublimation-purified mercurous chloride, evacuated to about $10^{-5}$ torr or less, and sealed at the bottom end 42 or 48, respectively. The ampoule is attached to a suspension rod (not shown) via the hook 61 and raised into the bottom of the furnace 50' of FIG. 4. After thermal equilibration, the tapered top 62 or 64 is raised into the cooler top zone of the furnace, causing the mercurous chloride vapors to condense in the taper of the ampoule. The ampoule is moved slowly, preferably at about 1–2 mm per day, so that the material deposits as a single crystal.

After the ampoule is moved completely through and out of the furnace the bottom is found to contain a black fluffy residue of iron and silver and possibly some free mercury, and the crystal appears yellowish. The ampoule preferably is opened, the residue removed, and the ampoule evacuated, resealed and rerun through the furnace. This process preferably is repeated once again, to obtain an essentially colorless crystal with only a trace of residue in the ampoule.

The finished crystal is removed by breaking the ampoule at the far end and sliding the crystal out. It is then oriented by any of the well-known techniques such as back reflection Laue photography. The crystal is mounted on a crystal holder with a low temperature thermoplastic substance such as glycol phthalate. A preferred procedure for melting the substance is to place the assembly in a cold oven, raise the temperature to about 100°C over about an hour, and then cool the oven over about 2 hours with the door held ajar. The oriented crystal is cut with any suitable means, such as a hot platinum wire or an abrasive slurry wire saw, and polished with the aid of a lubricant, preferably water, to avoid thermal etching.

Figure 6:
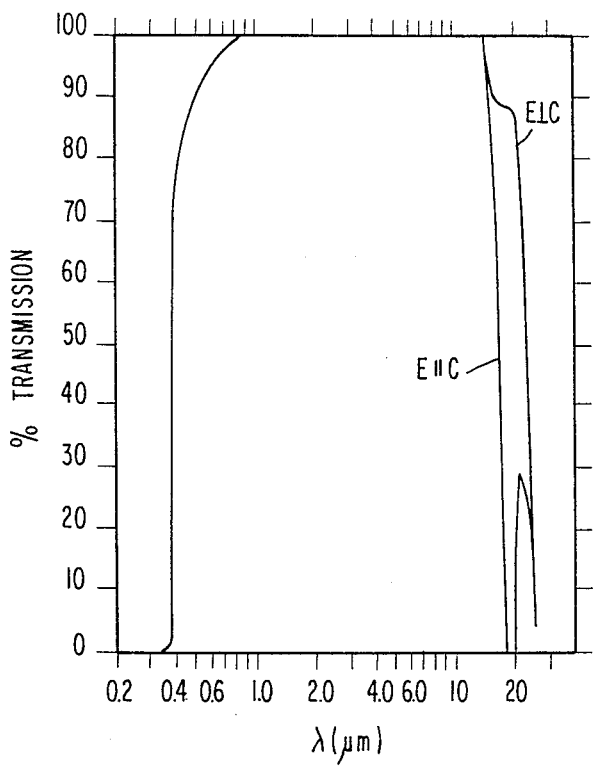
FIG. 6 is a graph of the optical transmission of the mercurous chloride crystals.

FIG. 6 shows the transmission characteristic of the finished crystal. It is transparent from the visible portion of the spectrum at 0.4–0.7 $\mu$m to about 16 $\mu$m in the infrared. No absorption bands are seen within these limits. The birefringence (difference in refractive indices for ordinary and extraordinary rays) is very high, being about 0.55 at about 0.6 $\mu$m, for example, and about 0.65 at about 11 $\mu$m. In addition, the absorption or attenuation of the material, as determined by calorimetric techniques, is very low; there is only about a 2 percent loss in intensity per cm of material traversed.

The above characteristics are surprisingly favorable and could not have been predicted from the data known to the applicants. The highly efficient transmission in the infrared makes the material particularly useful in conjunction with high-powered infrared lasers such as the $CO_2$ and CO gas lasers and various chemical lasers.

Figure 7:
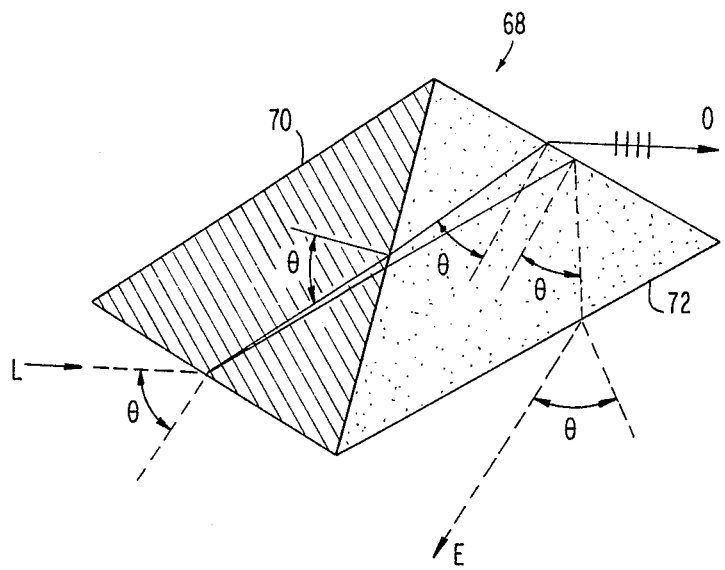
FIG. 7 is a sectioned elevation view of a mercurous chloride polarizing prism.

FIG. 7 illustrates a polarizing prism 68 constructed from a pure mercurous chloride crystal. This prism consists of two sections 70 and 72 which are cut and polished as described above and then joined together with a suitable cement or by optically wringing or contacting the surfaces. Section 70 is cut so that its optic axis is in the plane of the drawing and perpendicular to the extraordinary ray of the incident light beam L. Section 72 is cut so that its optic axis is perpendicular to the plane of the drawing. Furthermore, the angles $\theta$ are all at Brewster's angle so that there is no reflection. Accordingly, the incident beam L is doubly refracted in section 70 and again in section 72, due to the angular alignment of the optic axis of section 72. Since this axis is normal to the plane of the drawing, there is total internal reflection of the extraordinary ray E. The ordinary ray O is polarized parallel to the plane of the drawing and the E ray is perpendicular thereto.

It will be obvious to those skilled in the prism polarizer art that the pure mercurous chloride crystals, with their large birefringence, can be used to construct a wide variety of polarizers, such as Glan-Thompson, Wollaston, etc. It will also be obvious to those skilled in the single crystal arts that small amounts of other mercurous halides such as mercurous bromide or fluoride could be added to the starting mercurous chloride. These other halides would enhance various properties of the resulting single crystals—the water solubility, hardness, etc. It would further be obvious that monocrystals of these other mercurous halides, which also have large birefringences, could be used to construct prism polarizers if desired. The crystals would be grown using the techniques described above.

We claim:

1. The combination of:

means for emitting infrared radiation;

means including a single crystal of mercurous chloride for polarizing at least some of said radiation; and means for utilizing said polarized radiation.

2. The combination of claim 1, wherein said infrared radiation is in the region from about 0.7 to 16 $\mu$m.

3. The combination of claim 1 wherein said infrared-emitting means comprises a high-powered laser.

4. The combination of claim 1, wherein said single crystal is substantially pure mercurous chloride.

5. The combination of claim 1, wherein said single crystal consists essentially of pure mercurous chloride with small amounts of other mercurous halides to enchance its physical properites.

6. The combination of claim 1, wherein said single crystal comprises a birefringent prism.

7. The method of polarizing high-powered infrared radiation which comprises passing the radiation through a single crystal of mercurous chloride to separate the radiation into ordinary and extraordinary rays.

8. The method of claim 7, wherein said radiation is in the region from about 0.7 to 16 $\mu$m.

* * * * *